(12) United States Patent
Blomqvist et al.

(10) Patent No.: US 11,964,222 B2
(45) Date of Patent: Apr. 23, 2024

(54) FILTER ASSEMBLY FOR PLATE HEAT EXCHANGERS AND METHOD OF CLEANING A WORKING MEDIUM IN A PLATE HEAT EXCHANGER

(71) Applicant: CLIMEON AB, Kista (SE)

(72) Inventors: Erik Blomqvist, Bromma (SE); Kim Hilding, Sollentuna (SE); Esko Ahlbom, Uppsala (SE); Kari Munukka, Åkersberga (SE)

(73) Assignee: CLIMEON AB, Kista (SE)

( * ) Notice: Subject to any disclaimer, the term of this patent is extended or adjusted under 35 U.S.C. 154(b) by 626 days.

(21) Appl. No.: 17/057,633

(22) PCT Filed: May 14, 2019

(86) PCT No.: PCT/SE2019/050433
§ 371 (c)(1),
(2) Date: Nov. 20, 2020

(87) PCT Pub. No.: WO2019/226092
PCT Pub. Date: Nov. 28, 2019

(65) Prior Publication Data
US 2021/0205738 A1     Jul. 8, 2021

(30) Foreign Application Priority Data

May 22, 2018 (SE) .................................... 1850602-2

(51) Int. Cl.
*B01D 29/15* (2006.01)
*B01D 29/52* (2006.01)
*B01D 35/02* (2006.01)
*B01D 35/16* (2006.01)
*F28D 9/00* (2006.01)
*F28F 19/01* (2006.01)

(52) U.S. Cl.
CPC ............. *B01D 29/15* (2013.01); *B01D 29/52* (2013.01); *B01D 35/02* (2013.01); *B01D 35/16* (2013.01);
(Continued)

(58) Field of Classification Search
CPC ........ B01D 29/15; B01D 29/52; B01D 35/02; B01D 35/16; B01D 2201/0453;
(Continued)

(56) References Cited

U.S. PATENT DOCUMENTS 2,811,218 A * 10/1957 Winslow .............. B01D 35/147
210/172.6
3,355,021 A     11/1967 Jones
(Continued)

FOREIGN PATENT DOCUMENTS

CN          201444003 U     4/2010
CN          104422316 A     3/2015
(Continued)

OTHER PUBLICATIONS

PCT/SE2019/050433—International Search Report and Written Opinion dated Feb. 2, 2019, 12 pages.
SE1850602-2—Search Report dated Nov. 5, 2018, 3 pages.

*Primary Examiner* — Waqaas Ali
(74) *Attorney, Agent, or Firm* — Haynes Beffel & Wolfeld, LLP; Andrew L. Dunlap; Jason Liao

(57) ABSTRACT

A filter assembly for a plate heat exchanger comprising inlet and outlet ports for passage of a working medium and a cooling or heating fluid, respectively, wherein the filter assembly is dimensioned to fit into the inlet or outlet ports, wherein the filter assembly comprises a proximal flange and a distal flange and at least one filter tube attached at respective ends to the proximal flange and the distal flange, respectively, wherein the at least one filter tube is adapted to receive an elongated filter element and further comprises a plurality of inlet holes arranged on a circumferential surface thereof, and wherein the distal flange comprises at least one through-going outlet aperture in fluid communication with the interior of the at least one filter tube.

13 Claims, 6 Drawing Sheets

(52) U.S. Cl.
CPC .............. *F28D 9/005* (2013.01); *F28F 19/01* (2013.01); *B01D 2201/0453* (2013.01); *B01D 2201/0461* (2013.01); *F25B 2339/0441* (2013.01)

(58) Field of Classification Search
CPC .... B01D 2201/0461; B01D 2201/0415; B01D 29/13; F28D 9/005; F28D 2021/0063; F28F 19/01; F28F 3/083; F28F 9/0273; F28F 9/028; F25B 2339/0441; F28B 1/02
See application file for complete search history.

(56) References Cited

U.S. PATENT DOCUMENTS

| | | |
|---|---|---|
| 5,685,985 A | 11/1997 | Brown et al. |
| 5,916,435 A * | 6/1999 | Spearman ............... B01D 29/23 |
| | | 210/132 |
| 2003/0075495 A1* | 4/2003 | Dannstrom ............ B01D 63/02 |
| | | 210/321.89 |
| 2008/0223565 A1 | 9/2008 | Lai et al. |
| 2012/0061064 A1 | 3/2012 | Stromer et al. |
| 2013/0206873 A1 | 8/2013 | Mazenauer |
| 2013/0213625 A1* | 8/2013 | Sægrov ................... F28F 1/022 |
| | | 165/175 |

FOREIGN PATENT DOCUMENTS

| | | |
|---|---|---|
| CN | 104567490 A | 4/2015 |
| CN | 106556272 A | 4/2017 |
| CN | 207006949 U | 2/2018 |
| DE | 202008004582 U1 | 6/2008 |
| EP | 0580491 A1 | 1/1994 |
| KR | 20090006563 U | 7/2009 |
| WO | 1994014021 A1 | 6/1994 |
| WO | 2016198907 A1 | 12/2016 |

* cited by examiner

FILTER ASSEMBLY FOR PLATE HEAT EXCHANGERS AND METHOD OF CLEANING A WORKING MEDIUM IN A PLATE HEAT EXCHANGER

CROSS-REFERENCE

This application is the U.S. National Stage of International Application No. PCT/SE2019/050433, filed 14 May 2019, which claims priority to Swedish Application No. 1850602-2, filed 22 May 2018.

TECHNICAL FIELD

The present invention relates generally to plate heat exchangers and more specifically to a filter assembly for cleaning a working medium in a plate heat exchanger and a method of cleaning a working medium in a closed-loop cycle comprising a plate heat exchanger using a filter assembly.

BACKGROUND ART

There exist a number of systems and methods for converting low temperature heat or waste heat, e.g. from industrial processes or geothermal sources, into electricity by utilizing the phase change energy of a working medium produced in a thermodynamic closed-loop cycle such as a Rankine cycle, Organic Rankine Cycle (ORC), Kalina cycle or any other known thermodynamic closed loop power generating processes converting heat into power. For instance, WO 2012/128715 discloses such a heat conversion system including a power generation module. The power generation module comprises a turbine/generator, an evaporator/heat exchanger, a condenser and a main pump, and a working medium which is circulated through the module.

One type of heat exchanger that may be used in applications at moderate temperature and pressure is a plate heat exchanger (PHE), which consists of a plurality of corrugated metal (stainless steel) plates or sheets separated by polymer gaskets and clamped in a steel frame. Inlet portals and slots in the gaskets direct the hot and cold fluid to alternate spaces between the plates. The corrugations induce turbulence for improved heat transfer, and each plate is supported by multiple contacts with adjoining plates, which may have a different pattern or angle of corrugation. Said space between plates is equal to the depth of the corrugations and is usually 2 to 5 mm. Making each chamber thin ensures that the majority of the volume of the liquid contacts the plate, again aiding exchange. The plates produce an extremely large surface area, which allows for fast heat transfer. A high degree of turbulence can be obtained at low flow rates and high heat transfer coefficient can then be achieved. As an alternative for high-pressure fluid applications or where a more compact product is required, welded, semi-welded or brazed heat exchangers are used.

During start-up and after long-term operation of the power generation module, the working medium can be contaminated by particles, e.g. due to wear and/or chemical reactions, which may damage the components in the power generation module. Therefore, there is a need to clean the working medium after start-up or during regular maintenance or service. The cleaning procedure shall preferably be quick and easy so that the downtime of the module is as short as possible.

It is commonly known to install a filter downstream of the condensation chamber. Such known filter assemblies may include a filter housing with several filter cartridges inside and arranged to be connected to and disconnected from the closed-loop cycle. However, such filter assemblies are time-consuming to connect and disconnect from the closed-loop cycle of the power conversion module and may not accumulate all unwanted particles. Moreover, such a filter assembly requires additional space in the setting of the module, which is often not available.

Other examples include filters or strainers arranged in the inlet pipe of a heat exchanger to clean the working medium before it is guided through the plates of the heat exchanger, see for example KR20090006563U, CN207006949U, CN104567490A and WO 02/052215. Such filters are arranged to be permanently or semi-permanently mounted in the plate heat exchanger during continuous operation thereof and therefore usually include a mesh screen with big openings to enable a relatively large throughput flow. Consequently, these filters also do not accumulate all unwanted particles in the working medium, while at the same time negatively affecting the flow rate through the plate heat exchanger.

Hence, there is a need to develop improved devices and methods for efficiently cleaning the working medium in a plate heat exchanger whilst minimising the negative effect on the flow rate.

SUMMARY OF INVENTION

An object of the present invention is to provide improved devices and methods for effectively cleaning the working medium in a plate heat exchanger. This object is achieved in a first aspect, in which there is provided a filter assembly for a plate heat exchanger comprising inlet and outlet ports for passage of a working medium and a cooling or heating fluid, respectively, wherein the filter assembly is dimensioned to fit into the inlet or outlet ports, wherein the filter assembly comprises a proximal flange and a distal flange and at least one filter tube attached at respective ends to the proximal flange and the distal flange, respectively, wherein the at least one filter tube is adapted to receive an elongated filter element and further comprises a plurality of inlet holes arranged on a circumferential surface thereof, and wherein the distal flange comprises at least one through-going outlet aperture in fluid communication with the interior of the at least one filter tube.

By providing a filter assembly with one or more filter tubes for receiving elongated filter types, e.g. of cylindrical candle filter type, particles and contaminations caught by the filter elements are retained in the filter tubes and prevented from returning to the plate heat exchanger when circulation of the working medium (or cooling/heating fluid) is stopped. The present invention does not require a filter chamber surrounding the filter assembly and allows for insertion and mounting directly into the inlet or outlet port of the plate heat exchanger without additional pipe connections. Hence, considerably less space is required for carrying out a cleaning process of the working medium.

In a preferred embodiment, the plurality of inlet holes is arranged substantially in a longitudinal direction of the at least one filter tube and located substantially in the same angular position with respect to a longitudinal axis of the at least one filter tube. With the inlet holes linearly arranged in a row along the filter tube, ingress of fluid to be filtered is limited to a specific angular position, whilst egress of filtered particles and contaminations during removal of the filter assembly may be prevented.

In an advantageous embodiment, the filter assembly further comprises a plurality of filter tubes, wherein the distal flange comprises a plurality of through-going outlet apertures, each outlet aperture being in fluid communication with the interior of a respective one of the plurality of filter tubes. Preferably, the plurality of inlet holes on each of the plurality of filter tubes is located substantially in the same angular position with respect to the longitudinal axis of their respective filter tube.

In an alternative embodiment, the distal flange comprises a beveled surface which tapers inwardly in a distal direction of the filter assembly. The beveled surface facilitates insertion of the filter assembly and specifically alignment of the distal flange with the lining at the distal end of the inlet or outlet port.

In a preferred embodiment, the filter assembly further comprises a biasing element arranged inside the at least one filter tube to bias an elongated filter element towards the distal flange. The biasing element may be a compressible spring which allows filter elements of different lengths to be properly fitted in the filter tube.

In an advantageous embodiment, the proximal flange comprises at least one through-going access hole aligned with the at least one filter tube and a removable lid to cover the at least one through-going access hole. Preferably, the proximal flange comprises a plurality of through-going access holes, each aligned with a respective one of the plurality of filter tubes. The lid enables removal of the filter elements from the filter tubes to be washed, cleaned, and reused.

In an alternative embodiment, the lid comprises at least one drainage pipe in fluid communication with a lower end of the at least one filter tube, opposite the plurality of inlet holes. The drainage pipe allows for draining of the filter tube before removal of the filter assembly from the plate heat exchanger such that already filtered particles and contaminations do not return to the plate heat exchanger.

In a preferred embodiment, the at least one outlet aperture further comprises a pipe extending into the filter tube. The pipe acts as a guide and holder for the distal end of the elongated filter element, which in this case comprises a central hollow bore.

In a second aspect of the invention, there is provided a method of cleaning a working medium in a closed-loop cycle comprising a plate heat exchanger including a plurality of heat exchanger plates arranged adjacent each other in a frame and having through-going holes for passage of the working medium and a cooling or heating fluid, respectively, wherein the method comprises the steps of:
providing a filter assembly according to any one of the preceding claims including at least one elongated filter element arranged in the at least one filter tube;
inserting the filter assembly into an inlet or outlet port for the working medium in the plate heat exchanger;
fastening the filter assembly on a frame of the plate heat exchanger such that a fluid-tight seal is provided between the proximal flange and the outlet port; and
pumping the working medium in the closed-loop cycle such that it passes into the filter assembly through the holes on the surface of the at least one filter tube and out of the filter assembly through the at least one through-going aperture in the distal flange.

In a preferred embodiment, the method further comprises the step of:
adjusting the orientation of the filter assembly along a longitudinal axis of the inlet or outlet port by letting the filter assembly run on one or more inwardly tapered surfaces or projections arranged on the distal flange.

In an alternative embodiment, the filter assembly is inserted into an upper inlet or outlet port of the plate heat exchanger, wherein the upper inlet or outlet port is arranged above the fluid level of the working medium. By inserting the filter assembly in the upper inlet or outlet port, i.e. above the fluid level of the working medium in the plate heat exchanger when the closed-loop cycle is not running, emptying of the working medium from the plate heat exchanger is not necessary. Thereby, a quicker process of cleaning the working medium is achieved.

In an advantageous embodiment, the filter assembly is inserted such that the plurality of inlet holes is oriented in a substantially upward direction. The upward direction is in this context defined as the opposite of the direction of gravity. By orienting the inlet holes upwardly, the particles and contaminations which are too big to pass through the filter element are retained at the lower end of the filter tube by the effect of gravity, thus ensuring that they do not return to the working medium in the plate heat exchanger.

BRIEF DESCRIPTION OF DRAWINGS

The invention is now described, by way of example, with reference to the accompanying drawings, in which:

FIG. 1c shows a perspective, cross-sectional view of a proximal end of the filter assembly of FIG. 1a;

FIG. 1d shows a close-up side view of a distal end of the filter assembly of FIG. 1a;

FIG. 2b shows a perspective view of the lid seal of FIG. 2a mounted on a proximal end of the filter assembly of FIG. 1a;

DESCRIPTION OF EMBODIMENTS

Figure 1A:
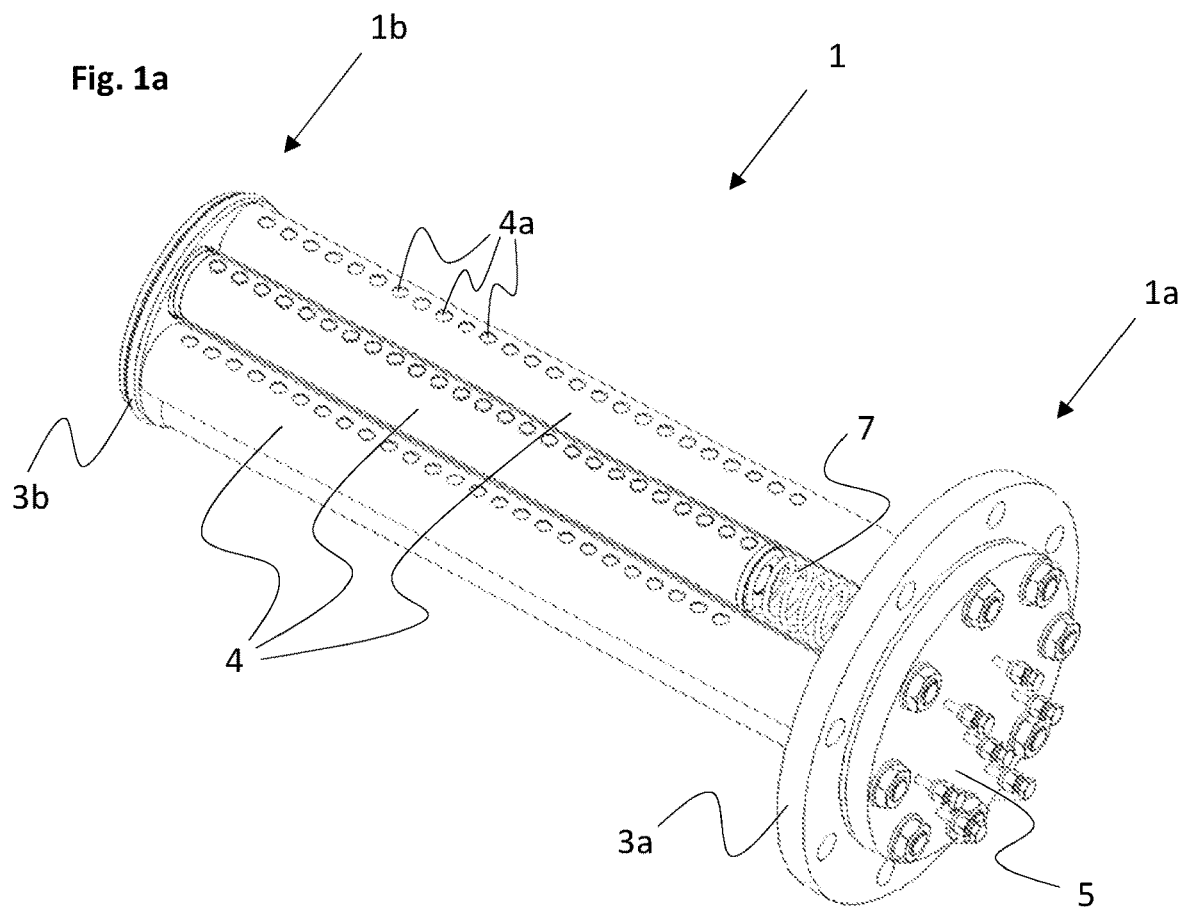
FIG. 1a shows a perspective view from a proximal end of a filter assembly according to one embodiment of the present invention.

In the following, a detailed description of methods and devices for filtering a fluid, such as a working medium, in a plate heat exchanger according to the present invention is provided. In the drawing figures, like reference numerals designate identical or corresponding elements throughout the several figures. It will be appreciated that these figures are for illustration only and are not in any way restricting the scope of the invention.

In the context of the present invention, the terms 'proximal' and 'distal' used to describe features of the filter assembly shall be understood as referring to features that are located closest to and furthest away from the operator, respectively, as seen in an insertion direction of the filter assembly into an inlet or outlet port of a plate heat exchanger.

In the context of the present invention, the terms 'upper' and 'lower' used to describe features of the plate heat exchanger In FIG. 1a, a filter assembly 1 according to one embodiment of the present invention is illustrated. The filter assembly 1 has a first, proximal end 1a and a second, distal end 1b, and is dimensioned to be arranged in an inlet or outlet port 11 of a plate heat exchanger 10. The filter assembly 1 comprises a first, proximal flange 3a, a second, distal flange 3b, and at least one filter tube 4 arranged to receive an elongated filter element 2. The filter assembly 1 shown in FIG. 1a comprises seven filter tubes 4, each having a cylindrical elongated filter element 2 arranged therein. As may be understood, the filter assembly 1 may comprise any suitable number of filter tubes 4, depending on the chosen dimensions and/or application of the filter assembly 1 and filter elements 2. The filter tubes 4 are attached at respective ends to the distal flange 3b and the proximal flange 3a, respectively. The filter tubes 4 are preferably welded to the proximal flange 3a and the distal flange 3b. However, any suitable means of attachment may be used.

The filter tubes 4 each comprises a plurality of inlet holes 4a arranged linearly along the circumferential surface of the filter tubes 4 to provide fluid communication with the interior of the filter tube 4. If we consider the filter tube 4 in terms of a cylindrical coordinate system with the longitudinal axis of the filter tube 4 as the reference axis, the inlet holes 4a all have substantially the same angular position thus forming a linear row of inlet holes 4a. As may be seen in FIGS. 1a-c, the angular position of the inlet holes 4a on the plurality of filter tubes 4 is substantially the same with respect to the longitudinal axis of the respective filter tubes 4. However, the inlet holes 4a may also be arranged slightly offset with respect to each other in the angular direction, i.e. not forming a straight row. Preferably, the inlet holes 4a are all arranged on the upper side of their respective filter tube 4, i.e. oriented upwardly opposite the direction of gravity, when the filter assembly 1 is inserted into the plate heat exchanger 10, as will be explained further below.

Figure 1B:
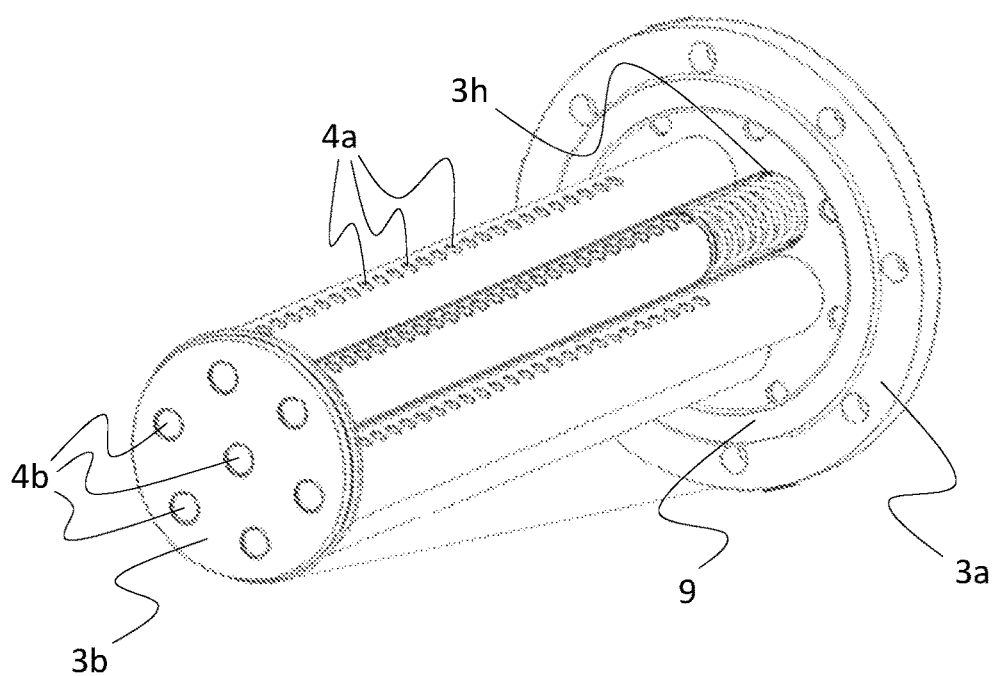
FIG. 1b shows a perspective view from a distal end of a filter assembly according to one embodiment of the present invention.

Furthermore, as shown in FIG. 1b, the distal flange 3b comprises a plurality of through-going outlet apertures 4b, each in fluid communication with the interior of the respective filter tubes 4. The inlet holes 4a and outlet apertures 4b together provide a flow path for a fluid through the interior of the filter tubes 4. Hence, when a fluid is passed through the filter tube 4, particles and contaminations will be caught and removed from the fluid by the elongated filter element 2 arranged in the filter tube 4. The flow direction of the working medium is from the outside to the inside of the filter element 2. Each outlet aperture 4b has a diameter smaller than the diameter of the filter elements 2 such that the filter element 2 are retained inside the respective filter tube 4.

Figure 1C:
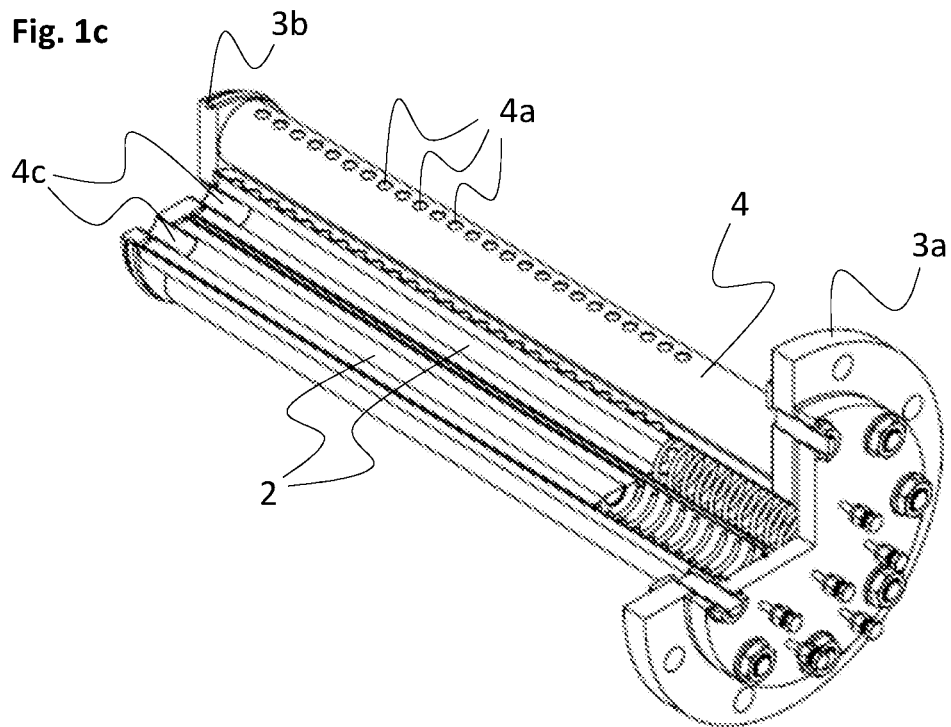

Turning now to FIG. 1c, each filter element 2 is arranged in a filter tube 4 to prevent that particles and contaminations are returned to the plate heat exchanger 10. Each outlet aperture 4b may further comprise a pipe 4c extending into the filter tube 4 to act as a guide during filter insertion. A hole on the distal end of the filter element 2 is guided onto the pipe 4c to ensure that the filter element 2 is and remains centrally aligned in the filter tube 4. Further, each filter element 2 may be pre-tensioned between the proximal flange 3a and the distal flange 3b by a biasing member, such as a compressible spring 7 acting between one of the flanges 3a, 3b and the respective end of the filter element 2.

Figure 1D:
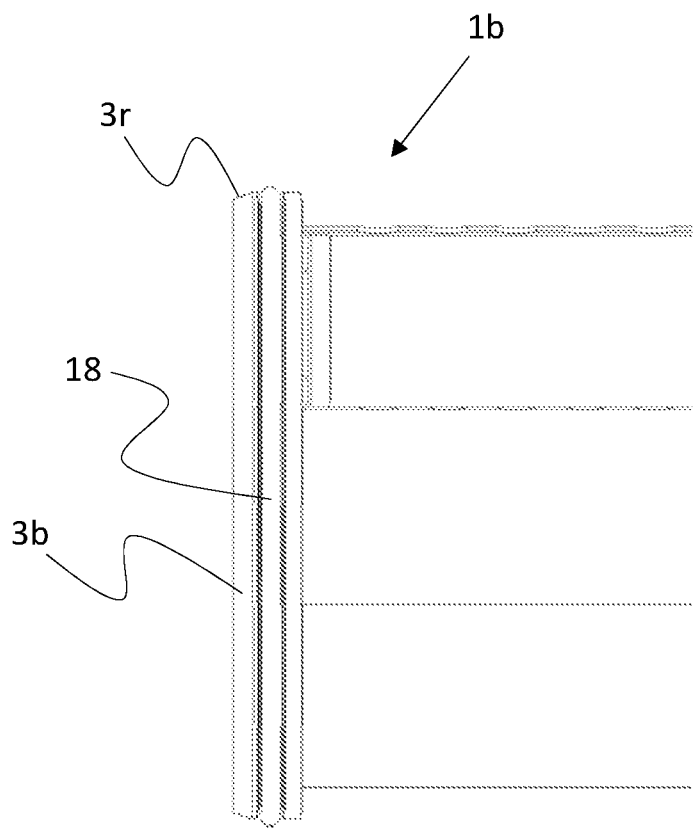

The distal end 1b of the filter assembly 1 is shown in a close-up view in FIG. 1d. The second distal flange 3b may comprise a gasket or O-ring 18 to provide a seal against the inner lining of the inlet or outlet port 11 in the plate heat exchanger 10. Additionally, the distal flange 3b may have a beveled radial surface 3r which tapers inwardly in a distal direction to facilitate insertion of the filter assembly 1 into the plate heat exchanger 10, specifically the lining in the distal portion of the inlet or outlet port 11. As an alternative, or in addition, the distal flange 3b may comprise one or more projections (not shown) which are inwardly tapered in a distal direction of the filter assembly 1.

The filter elements 2 arranged in the filter tubes 4 may for instance be of a candle filter type including a central bore and several layers of a folded wire mesh material to create a large surface area. For filtration, flow to the candle filter is from the outside to the inside, so that mechanical filtration of the surface can be carried out. Particles and contaminations which are too big to pass through the wire mesh are retained in the space between the filter element 2 and the filter tube 4 and thus prevented from returning to the working medium in the plate heat exchanger 10.

Figure 1E:
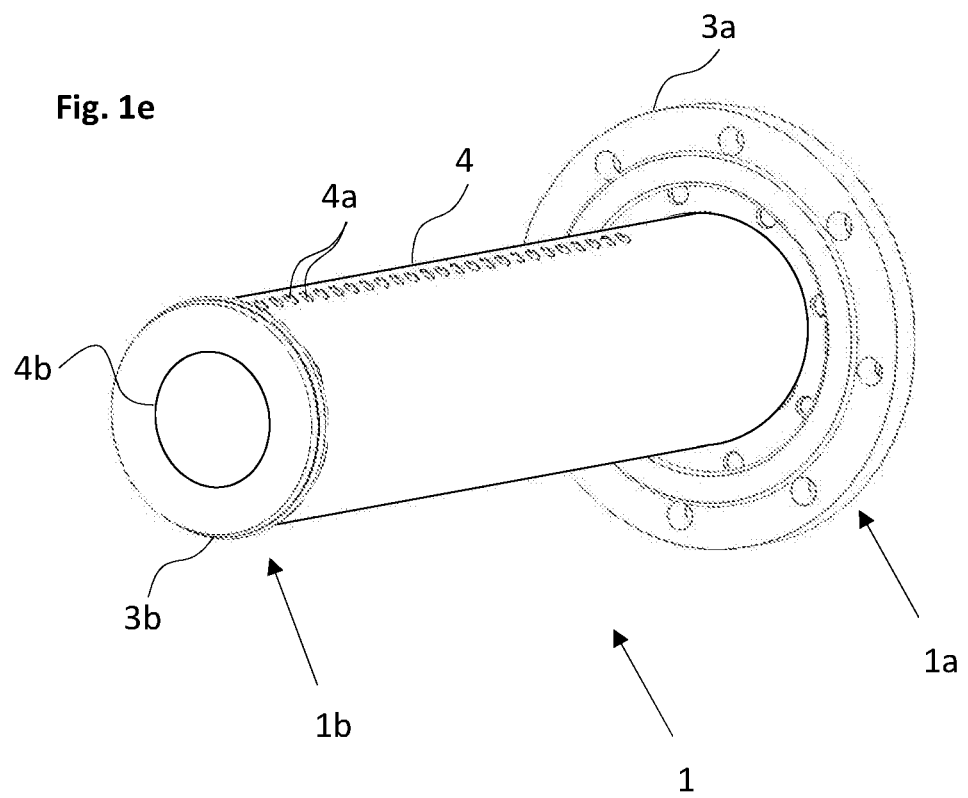
FIG. 1e shows a perspective view from a distal end of a filter assembly according to yet another embodiment of the present invention.

In FIG. 1e, a filter assembly 1 according to yet another embodiment of the present invention is illustrated. The filter assembly 1 has a first, proximal end 1a and a second, distal end 1b and is dimensioned to be arranged in an inlet or outlet port 11 of a plate heat exchanger 10. The filter assembly 1 comprises a first, proximal flange 3a, a second, distal flange 3b. The filter assembly 1 shown in FIG. 1e comprises one filter tube 4 adapted to receive one elongated filter element 2 arranged therein. As may be understood, the filter assembly 1 may comprise any suitable number of filter tubes 4, depending on the chosen dimensions and/or application of the filter assembly 1 and filter elements 2. The filter tube 4 is attached at respective ends to the distal flange 3b and the proximal flange 3a, respectively. The filter tube 4 is preferably welded to the proximal flange 3a and the distal flange 3b. However, any suitable means of attachment may be used.

Figure 2A:
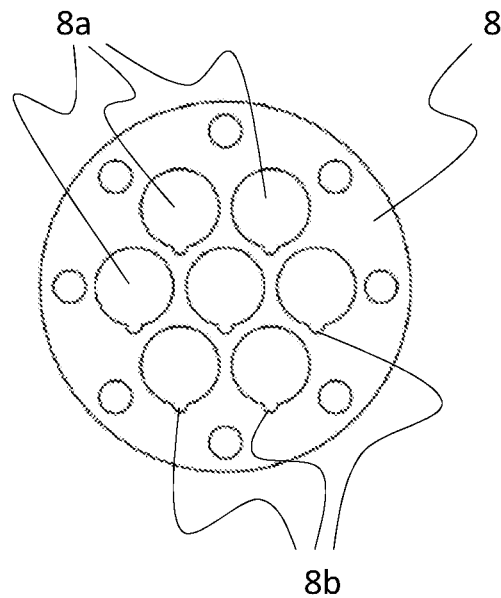
FIG. 2a shows a front view of a lid seal.
Figure 2B:
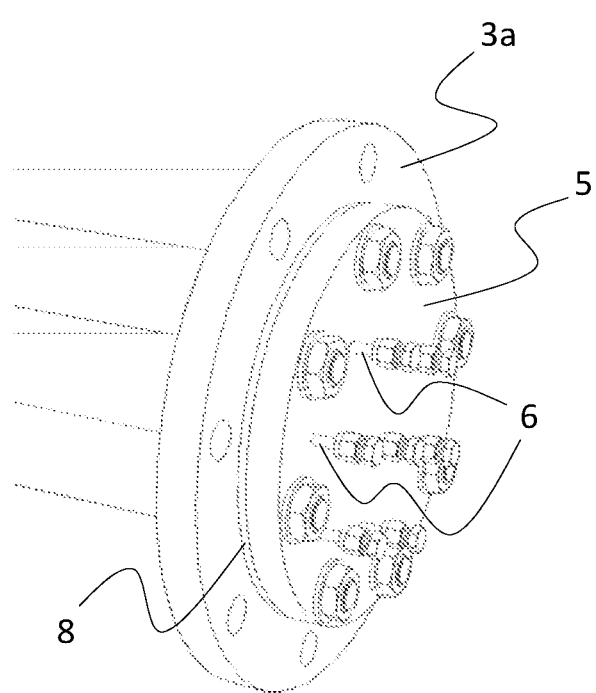

The filter elements 2 are preferably washable and reusable. To that end, the proximal flange 3a comprises access holes 3h (shown in FIG. 1b) through which the filter elements 2 may be inserted and removed for cleaning. A removable lid 5 is fastened to the proximal flange 3a by means of bolts to cover the access holes 3h. The lid 5 is sealed against the proximal flange 3a by a seal 8 as illustrated in FIGS. 2a and 2b. For instance, the seal 8 may be a 5 mm EPDM seal. In the lid 5 there are also provided drainage pipes 6. Each drainage pipe 6 is connected to the lower side of a respective filter tube 4, i.e. the side opposite the inlet holes 4a. The drainage pipes 6 are normally plugged but can be used to empty remaining fluid (working medium) from the filter assembly 1 before demounting of the filter assembly 1 from the inlet or outlet port 11 of the plate heat exchanger 10. The lid seal 8 has a circular opening 8a for each pipe 4 with cut-outs 8b such that the working medium is guided into each drainage pipe 6. Each circular opening 8a is dimensioned larger than the diameter of the springs 7, so that each pre-tensioning spring 7 presses directly on the lid 5.

Figure 3A:
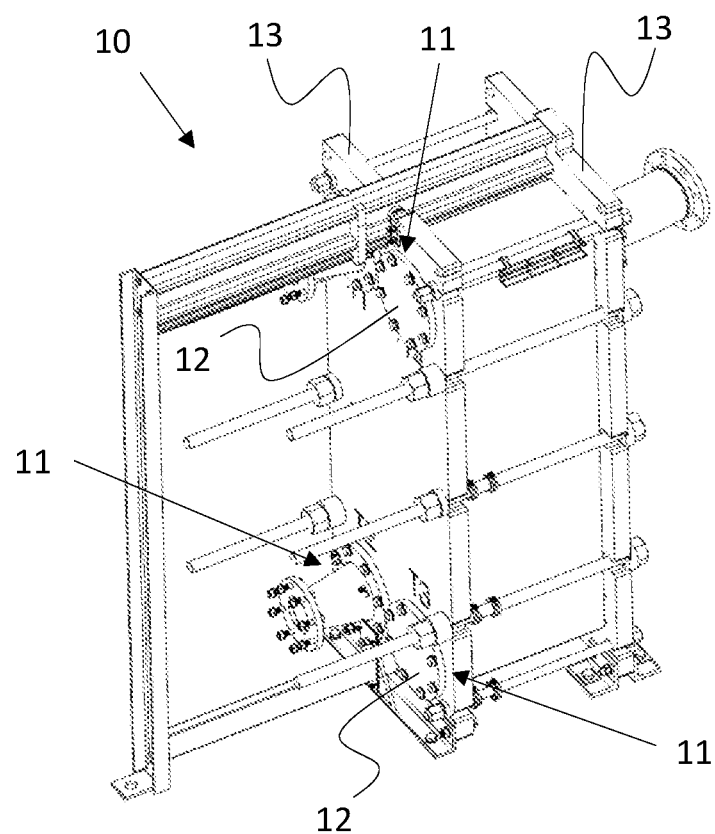
FIGS. 3a, 3b and 3c show a perspective view of a plate heat exchanger during different stages of mounting the filter assembly of FIG. 1a in a port of the plate heat exchanger.

Turning now to FIGS. 3a-3d, a method of cleaning a working medium in a plate heat exchanger 10 in accordance with a second aspect of the present invention will be described. FIG. 3a illustrates a plate heat exchanger 10 having four ports 11 (labeled T1, T2, T3, T4) providing an inlet and outlet for the working medium and a cooling or heating fluid, respectively. The ports 11 are formed by the through-going holes in the heat exchanger plates making up the plate heat exchanger 10, as shown more clearly in FIG. 3d. As may be seen in FIG. 3a, each of the ports 11 have a pipe connection on one side of the plate heat exchanger 10 (cf. T1 and T2) and a cover plate 12 on the other side (cf. T3 and T4). The filter assembly 1 according to the present invention may be used to clean the working medium flowing through the plate heat exchanger 10 but could conceivably also be used to filter particles and contaminations in the cooling or heating fluid as well. However, since the filter assembly 1 reduces the flow rate of the fluid through the plate heat exchanger 10, it is not intended to be permanently mounted, but rather mounted during a determined period of time. Also, since the working medium is circulated in a closed-loop cycle and passes multiple times through the plate heat exchanger, as opposed to the cooling or heating fluid which may pass only once through the plate heat exchanger 10, the filter assembly 1 is intended to be used to clean the working medium rather than the cooling or heating fluid.

Figure 3B:
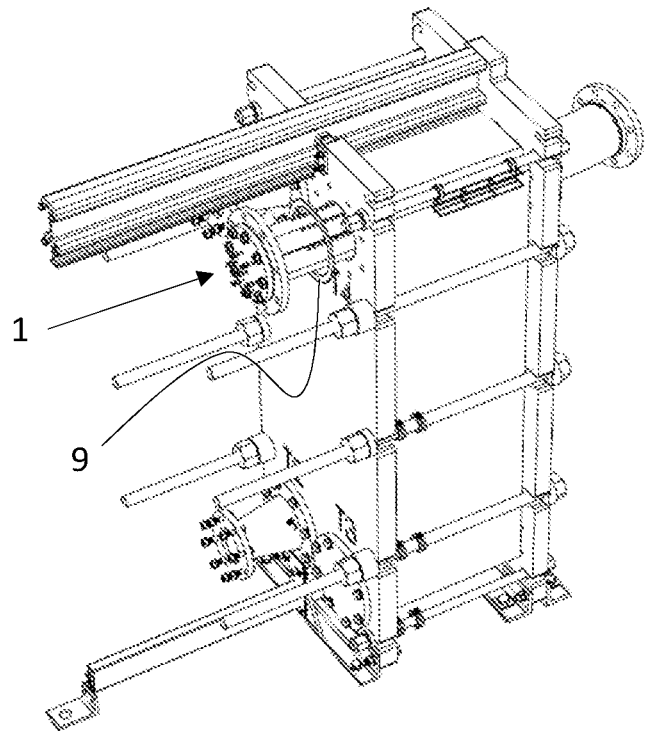

In FIG. 3b, the cover plate 12 on the upper port 11 (labeled T4) has been removed and the filter assembly 1 is shown partially inserted. A gasket 9 is shown between the proximal flange 3a and the end frame 13 of the plate heat exchanger 10. The proximal flange 3a comprises through-going holes corresponding to the holes on the cover plate 12 to allow fastening of the filter assembly 1 in the plate heat exchanger 10, more specifically, fastening of the proximal flange 3a to the end frame. The gasket provides a fluid-tight seal therebetween. Additionally, it may be seen that the filter assembly 1 is inserted such that the plurality of inlet holes 4a in the filter tubes 4 is oriented in a substantially upward direction towards the upper portion of the plate heat exchanger, i.e. in a direction opposite the direction of gravity. Hence, as explained above, the particles and contaminations which are too big to pass through the filter elements 2 are retained in the space between the filter element 2 and the filter tube 4. Under the effect of gravity, filtered particles and contaminations move towards and remain at the lower end of the filter tubes 4. With the inlet holes 4a being oriented substantially upwardly, the filtered particles and contaminations are thus prevented from returning to the working medium in the plate heat exchanger 10.

Figure 3C:
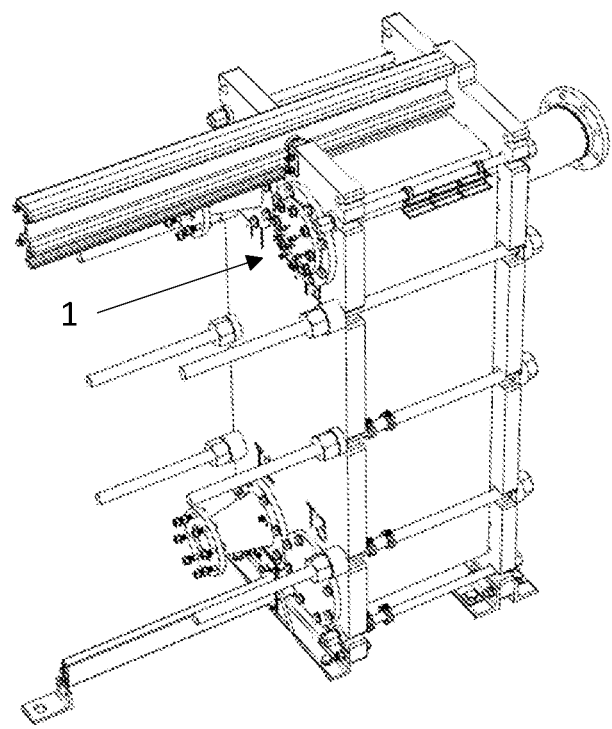

Further, FIG. 3c shows the filter assembly 1 completely inserted in the plate heat exchanger 10 and with the proximal flange 3a fastened on the end frame 13 by means of bolts.

Preferably, the filter assembly 1 is mounted in an upper port 11 of the plate heat exchanger 10. Normally, the fluid level of the working medium in the plate heat exchanger 10 is below the upper port 11 when the closed-loop cycle in the power generation module is not running. Hence, mounting the filter assembly 1 in the upper port 11 obviates the need to empty the plate heat exchanger 10 of working medium before inserting the filter assembly 1. However, the filter assembly 1 is not restricted to being mounted in the upper port 11 but may be inserted into any of the ports 11 of the plate heat exchanger 10 having a diameter and length commensurate with the dimensions of the filter assembly 1.

Figure 3D:
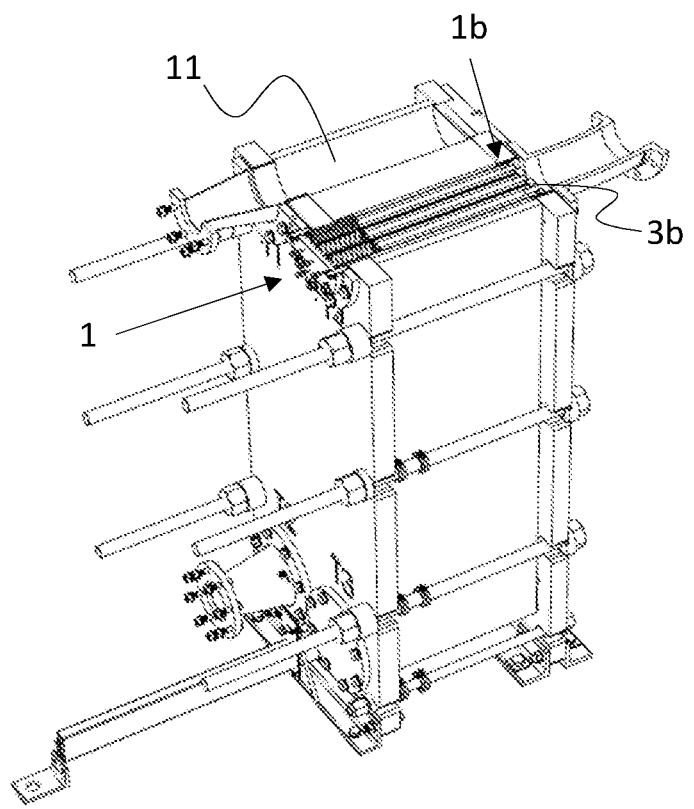
FIG. 3d shows a perspective cross-sectional view of a plate heat exchanger having the filter assembly of FIG. 1a mounted in a port thereof. The amendments included in the substitute specification are made to describe FIGS. 6G, 6H, 6I and 6J

FIG. 3d shows the completely inserted filter assembly 1 and the upper part of the plate heat exchanger 10 in cross section. The other upper port 11 (labeled T1) is here shown more visibly. The distal end 1b is aligned with the distal opening of the port 11. The distal flange 3b is accommodated in the distal opening and the O-ring 18 on the distal flange 3b provides a fluid-tight seal against the lining of the port 11 in the opening on the opposite end frame.

In one exemplary embodiment, the entire filter assembly 1 weighs approximately 45 kg and the filter elements 2 are preferably 5 μm-filters having a length of approximately 520 mm. The filter tubes 4 can have different lengths depending on the construction (thickness and number of plates) of the plate heat exchanger 10. However, preferably the same type of filter elements 2 is used for all applications. Thus, additional springs 7 and washers are added to compensate for the different dimensions. At a pressure drop of 0.5 bar the filters will provide a flow rate of approximately 4.5 l/s. I.e. with a volume of 600 litres of working medium in the power generation module, the complete cleaning procedure can be performed in a couple of minutes. However, it is preferred that the working medium is circulated through the filter assembly 1 for at least 15 minutes.

The foregoing description of the preferred embodiments of the present invention is provided for illustrative and descriptive purposes. It is not intended to be exhaustive or to restrict the invention to the variants described. Many modifications and variations will obviously be apparent to one skilled in the art.

The invention claimed is:

1. A filter assembly adapted to be assembled with a plate heat exchanger comprising inlet and outlet ports for passage of a working medium and a cooling or heating fluid, respectively, the filter assembly comprising:
   a proximal flange;
   a distal flange; and
   at least one filter tube attached at respective ends to the proximal flange and the distal flange, respectively,
   wherein the filter assembly is dimensioned to fit into the inlet or outlet ports of the plate heat exchanger,
   wherein the at least one filter tube is adapted to receive an elongated filter element therein,
   wherein the at least one filter tube comprises a plurality of inlet holes arranged on a circumferential surface thereof,
   wherein the distal flange comprises at least one through-going outlet aperture in fluid communication with an interior of the at least one filter tube,
   wherein the plurality of inlet holes is arranged substantially in a longitudinal direction of the at least one filter tube and is located substantially in a same angular position with respect to a longitudinal axis of the at least one filter tube,
   wherein the filter assembly further comprises a plurality of filter tubes,
   wherein the distal flange comprises a plurality of through-going outlet apertures, each through-going outlet aperture of the plurality of through-going outlet apertures being in fluid communication with the interior of a respective one of the plurality of filter tubes, and
   wherein the proximal flange comprises a plurality of through-going access holes, each through-going access hole of the plurality of through-going access holes being aligned with a respective one of the plurality of filter tubes.

2. The filter assembly according to claim 1,
   wherein the distal flange comprises a plurality of through-going outlet apertures, each through-going outlet aperture of the plurality of through-going outlet apertures being in fluid communication with the interior of a respective one of the plurality of filter tubes.

3. The filter assembly of claim 2, wherein the plurality of inlet holes on each of the plurality of filter tubes is located substantially in the same angular position with respect to the longitudinal axis of their respective filter tube.

4. The filter assembly according to claim 1, wherein the distal flange comprises a beveled surface, which tapers inwardly in a distal direction of the filter assembly.

5. The filter assembly according to claim 1, further comprising a biasing element arranged inside the at least one filter tube to bias the elongated filter element towards the distal flange.

6. The filter assembly according to claim 1, wherein the proximal flange comprises:
   at least one through-going access hole aligned with the at least one filter tube; and
   a removable lid to cover the at least one through-going access hole.

7. The filter assembly according to claim 6, wherein the removable lid comprises at least one drainage pipe in fluid communication with a lower end of the at least one filter tube, opposite the plurality of inlet holes.

8. The filter assembly according to claim 1, wherein the at least one through-going outlet aperture further comprises a pipe extending into the filter tube.

9. A method of cleaning a working medium in a closed-loop cycle comprising a plate heat exchanger including a plurality of heat exchanger plates arranged adjacent each other in a frame and having through-going holes for passage of the working medium and a cooling or heating fluid, respectively, the method comprising:
   providing a filter assembly including a proximal flange, a distal flange, at least one filter tube attached at respective ends to the proximal flange and the distal flange, respectively, at least one elongated filter element arranged in the at least one filter tube, a plurality of inlet holes arranged on a circumferential surface of the at least one filter tube, and at least one through-going outlet aperture arranged in the distal flange and in fluid communication with the interior of the at least one filter tube, wherein the filter assembly is dimensioned to fit into inlet or outlet ports of the plate heat exchanger, and wherein the plurality of inlet holes is arranged substantially in a longitudinal direction of the at least one filter tube and is located substantially in a same angular position with respect to a longitudinal axis of the at least one filter tube;
   inserting the filter assembly into an inlet or outlet port for the working medium in the plate heat exchanger, wherein the filter assembly is inserted such that the plurality of inlet holes is oriented in a substantially upward direction, opposite a direction of gravity;
   fastening the filter assembly on the frame of the plate heat exchanger, such that a fluid-tight seal is provided between the proximal flange and the inlet or outlet port;
   pumping the working medium in the closed-loop cycle, such that it passes into the filter assembly through the inlet holes on the surface of the at least one filter tube and out of the filter assembly through the at least one through-going aperture in the distal flange;
   wherein the filter assembly comprises a plurality of filter tubes;
   wherein the distal flange comprises a plurality of through-going outlet apertures, each through-going outlet aperture of the plurality of through-going outlet apertures being in fluid communication with the interior of a respective one of the plurality of filter tubes, and
   wherein the proximal flange comprises a plurality of through-going access holes, each through-going access hole of the plurality of through-going access holes being aligned with a respective one of the at least one filter tube.

10. The method according to claim 9, further comprising adjusting the orientation of the filter assembly along a longitudinal axis of the inlet or outlet port by letting the filter assembly run on one or more inwardly tapered surfaces or projections arranged on the distal flange.

11. The method according to claim 9,
   wherein the filter assembly is inserted into an upper inlet or outlet port of the plate heat exchanger, and
   wherein the upper inlet or outlet port is arranged above a fluid level of the working medium.

12. The filter assembly of claim 1, wherein the filter assembly is horizontally arranged and the plate heat exchanger inlet and outlet ports are horizontally arranged.

13. The filter assembly of claim 1, wherein the plate heat exchanger is oriented with vertical plates and the filter assembly is adapted accordingly.

* * * * *